(12) United States Patent
Chaggar et al.

(10) Patent No.: US 9,163,558 B1
(45) Date of Patent: Oct. 20, 2015

(54) COMPLEX PATH DESIGN OF THE FLINGER AND INSERT

(71) Applicant: BorgWarner Inc., Auburn Hills, MI (US)

(72) Inventors: Sanjit Chaggar, Bradford (GB); Martin Jarvis, Oldham (GB); Sean Rylance, Barnsley (GB)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/644,705

(22) Filed: Mar. 11, 2015

(51) Int. Cl.
*F04D 29/063* (2006.01)
*F02B 39/14* (2006.01)
*F02C 6/12* (2006.01)
*F04D 17/10* (2006.01)
*F04D 29/10* (2006.01)
*F04D 29/12* (2006.01)

(52) U.S. Cl.
CPC . *F02B 39/14* (2013.01); *F02C 6/12* (2013.01); *F04D 17/10* (2013.01); *F04D 29/063* (2013.01); *F04D 29/102* (2013.01); *F04D 29/124* (2013.01); *F05D 2220/40* (2013.01); *F05D 2240/55* (2013.01); *F05D 2240/70* (2013.01); *F05D 2260/98* (2013.01)

(58) Field of Classification Search
CPC . F04D 29/063; F04D 29/124; F05D 2240/55; F05D 2240/70; F05D 2260/98
USPC .............................................. 415/112, 174.5
See application file for complete search history.

(56) References Cited

U.S. PATENT DOCUMENTS

| | | | | |
|---|---|---|---|---|
| 3,494,679 A | * | 2/1970 | Burdette | 384/139 |
| 8,794,917 B2 | * | 8/2014 | Boning et al. | 415/229 |
| 2002/0141862 A1 | * | 10/2002 | McEwen | 415/111 |
| 2010/0129212 A1 | * | 5/2010 | Berger et al. | 415/229 |
| 2014/0234075 A1 | * | 8/2014 | Weber et al. | 415/112 |

* cited by examiner

*Primary Examiner* — Ninh H Nguyen
(74) *Attorney, Agent, or Firm* — BrooksGroup

(57) ABSTRACT

A product for use with a turbocharger that may include a complex sealing path between a lubricated area of a housing and a compressor wheel.

20 Claims, 3 Drawing Sheets

COMPLEX PATH DESIGN OF THE FLINGER AND INSERT

TECHNICAL FIELD

The field to which the disclosure generally relates includes turbocharger systems and in particular, relates to turbocharger construction to address sealing.

BACKGROUND

A turbocharger typically consists of a compressor driven by a turbine. The turbine may be connected to the compressor by a common shaft that is supported for rotation by bearings. The turbocharger, the shaft and the turbine wheel may rotate at speeds that approach hundreds of thousands of revolutions per minute. Under these harsh, and increasingly demanding operating conditions, the lifespan of a turbocharger is expected to match that of the engine with which it operates. To accomplish that challenge, the design of a turbocharger and its components must be robust to survive as expected, while still being cost effective.

SUMMARY OF ILLUSTRATIVE VARIATIONS

A product for use with a turbocharger system according to a number of variations may include a housing with a shaft that extends into the housing. A compressor wheel may be connected to the shaft. An insert assembly may be disposed around the shaft and may be positioned between the compressor wheel and the housing. The insert assembly may include first and second components that are engaged through a series of intermeshing elements defining a tortuous sealing path. The second component may include an oil flinger section that extends radially outward from the cylindrical section.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
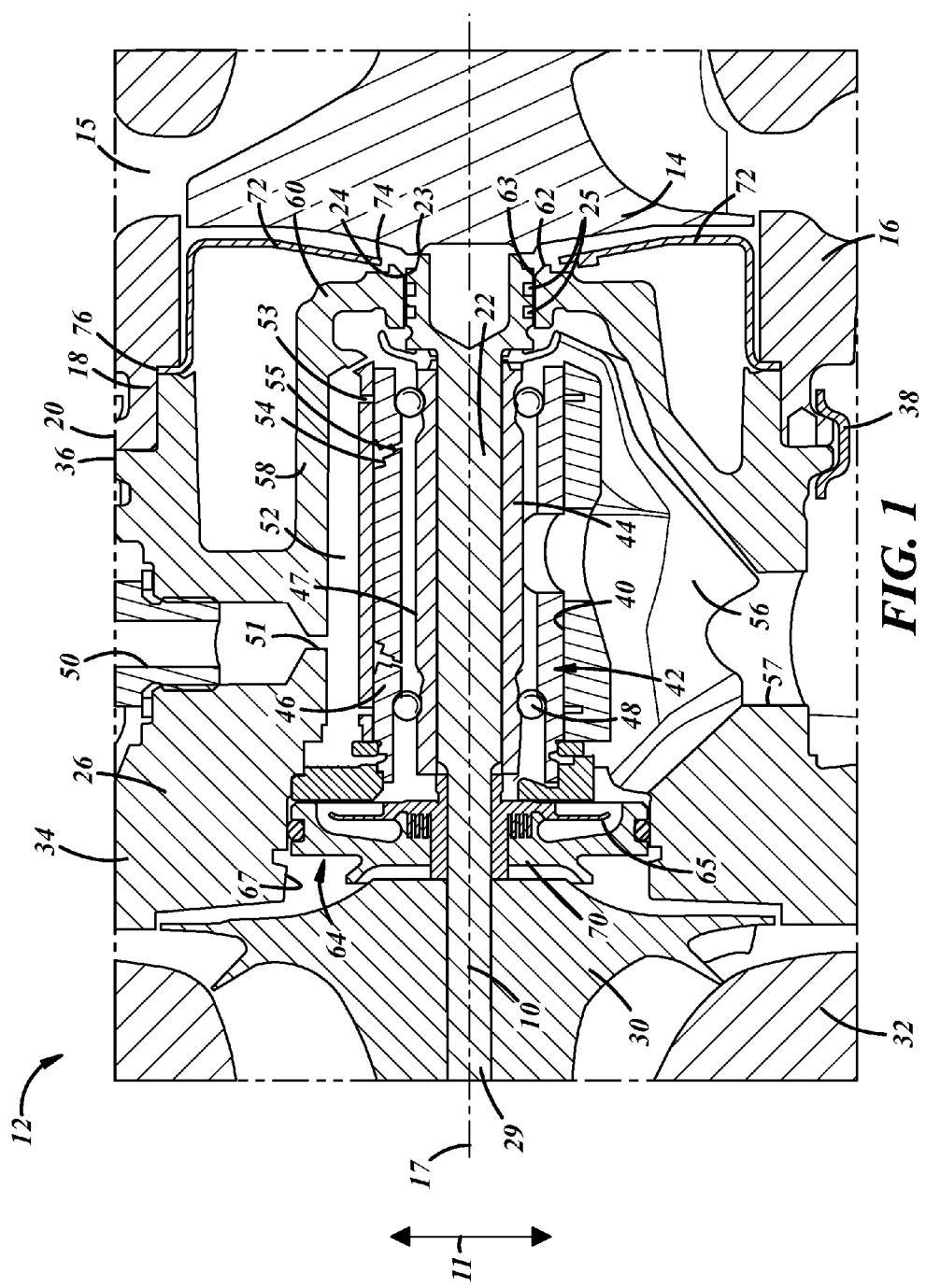
FIG. 1 is a fragmentary cross sectional illustration of a product for use with a turbocharger system according to a number of variations.

In the description associated with FIG. 1, elements may be described in relation to the direction in which parts extend. In this regard, reference number 10 indicates a line that extends in the axial direction, which coincides with left and right in the view of FIG. 1. The line indicating the axial direction 10 is shown coinciding with a central axis 17 of the product 12, and in particular of the rotational center of the shaft and wheels. An axial extending part will extend on a line parallel to, or on, the central axis 17. Reference numeral 11 indicates a line that extends in the radial direction, which means toward or away from the central axis 17, and includes the vertical direction as viewed in FIG. 1.

In the product 12, which may be used with a turbocharger system for an internal combustion engine and in particular, with a turbocharger core or cartridge assembly, a turbine wheel 14 as shown in FIG. 1 may exist in a continuous high velocity jet of exhaust gases entering through the volute 15 when the engine is running. The volute 15 may be defined by a turbine housing 16, which may include an axially extending flange 18 that terminates at a radially outward extending flange 20. The turbine wheel 14 may be connected to a shaft 22. The shaft 22 may include an enlarged segment at or near an end 23 forming a bearing segment 24. The bearing segment 24 may have a number of annular grooves holding piston-type seal rings 25. The piston type seal rings may be similar to those used on the pistons of an internal combustion engine, and as such are designed to operate in a harsh environment. The shaft 22 may extend in the axial direction 10 along the central axis 17, and through a center housing referred to as the bearing housing 26. The shaft 22 may include a reduced segment at or near an end 29 and may be connected to a compressor wheel 30. The compressor wheel 30 may rotate with the shaft 22 and turbine wheel 14. The compressor wheel 30 may be disposed to rotate in a compressor housing 32.

The bearing housing 26 may include a flange 34 on the compressor side, which extends outwardly in the radially direction 11 and may be configured for connection to the compressor housing 32. A number of fasteners (not shown), may be used to secure the bearing housing 26 to the compressor housing 32. The bearing housing 26 may also have a flange 36 on the turbine side, which may be configured to mate with the flange 20 of the turbine housing 16. A band clamp 38 may be used to secure the bearing housing 26 to the turbine housing 16.

An opening may be provided in the bearing housing 26 about the central axis 17 forming a bearing cavity 40. The bearing cavity 40 may extend along the central axis 17 and around the shaft 22. A bearing assembly 42 may be positioned in the bearing cavity 40 and may include an inner race 44 and an outer race 46. The inner race 44 may have a hollow, substantially cylindrical shape and may closely fit over the shaft 22 around a bearing segment thereof. The outer race may also have a hollow, substantially cylindrical shape and may fit closely within the bearing cavity 40. A cylindrically shaped gap 47 may be provided between the inner race 44 and the outer race 46, with annular grooves in the inner and outer races carrying a number of ball bearings 48 so that the inner and outer races may freely rotate relative to one another.

The bearing assembly 42 may be lubricated, and an oil delivery system may be provided with a supply line at fitting 50, which may be interconnected with an associated engine's pressurized oil delivery system. The bearing assembly may be provided with a supply of oil through bore 51 which extends in the radial direction 11, and through the interconnected bore 52, which extends in the axial direction 10 alongside the bearing cavity 40. The bore 52 may be intersected by a number of annular grooves 53 that extend around the central axis 17 interconnecting the bore 52 with the bearing cavity 40. In addition, a number of angled grooves 54 may be formed in the outer surface of the outer race 46 with intersecting oil jets 55 that open to the gap 47, to supply oil to the ball bearings 48. The bearing housing 26 may have an oil collection cavity 56 with an oil drain 57 to return oil to the associated engine.

The bearing housing 26 may have a wall section 58 extending axially toward the turbine wheel 14 and extending around the circumference of the bearing cavity 40. The wall section 58 may turn radially inward and connect with a turbine end spacer wall 60 that surrounds the turbine end of the bearing housing 26. The turbine end spacer wall 60 may include an annular ring segment 62 that defines an end opening 63 in the turbine end spacer wall 60 about the central axis 17 that opens to the bearing cavity 40. The bearing segment 24 of the shaft 22 may be positioned in the end opening 63 and may rotate therein. A heat shield 72 may have an inner opening 74 through which the shaft 22 extends and may have a peripheral rim forming an outer flange 76 configured to engage the bearing housing 26.

The product 12 may include a compressor end seal mechanism including an insert assembly 64 disposed around the shaft 22 and generally positioned between the compressor wheel 30 and the bearing housing 26 to close the aperture 67. The insert assembly 64 may include a first component in the form of a core 65 that rotates with the shaft 22 and a second component in the form of an insert 70 that is fixed to the bearing housing 26 within aperture 67. The insert assembly 64 provides a mechanism to seal the lubricated area inside the bearing housing 26 so that lubricant does not migrate to the compressor area around compressor wheel 30. Effective sealing is needed to maintain the integrity of the lubrication circuit of the product 12 which may be integrated with the lubrication system of the associated internal combustion engine.

Figure 2:
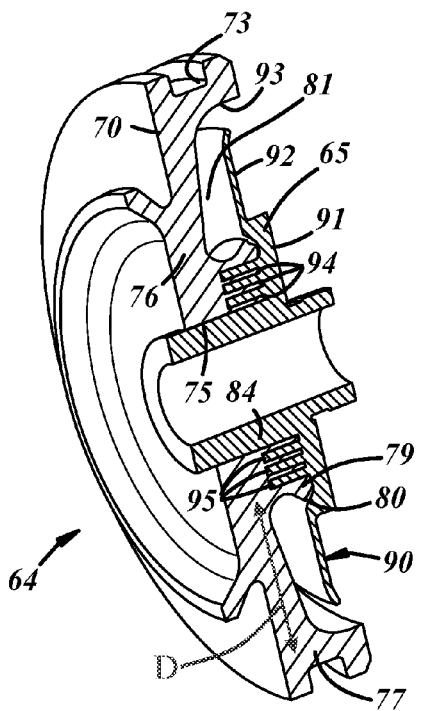
FIG. 2 is an isometric sectioned illustration of the flinger and insert of FIG. 1.

Referring to FIG. 2, the insert assembly 64 according to a number of variations is illustrated. The core 65 and the insert 70 may be engaged through a series of intermeshing elements defining a tortuous sealing path resistant to the flow of lubricant. The intermeshing elements may be coaxially disposed. The insert 70 may include an axial opening 75 with an annular wall 76 extending radially outward and around the axial opening 75. The annular wall 76 may terminate at a circumferential wall 77 that extends axially from the annular wall 76. The circumferential wall 77 may engage the bearing housing 26 as shown in FIG. 1, with a seal in the groove 73, which may be a conventional non-piston type seal since the sealed surfaces do not rotate relative to each other. The insert 70 may include an engagement wall 79 that extends axially from the annular wall 76 and may be located radially inside from, and spaced apart from, the circumferential wall 77. The engagement wall 79 may include an annular ridge 80 that extends radially outward. An annular cavity 81 may be defined between the circumferential wall 77 and the engagement wall 79.

The core 65 may include a cylindrical section 84 that extends axially through the axial opening 75 of the insert 70. A flinger section 90 may extend along the bearing housing 26 side of the annular ridge 80 and radially outward from the cylindrical section 84. The flinger section 90 may include an inner support section 91 and an outer rim section 92. The outer rim section 92 of the flinger section 90 may be configured to direct lubricant into the cavity 81 and at the wall 93 of the insert 70 as it spins. The cylindrical section 84 may extend axially beyond the annular wall 76 on one side and may extend axially beyond the flinger section 90 on the other side where it may provide a spacer feature.

The insert assembly 64 may include a series of intermeshing elements which may include three projecting annular walls 94 on the insert 70 that extend axially toward the support section 91 of the core 65. Three annular meshing walls 95 on the core 65 may extend axially toward the insert 70 and may intermesh between the three projecting walls 94 and the engagement wall 79. The intermeshing walls provide a complex sealing path and since the lubricant is on the core 65 side of the insert assembly 64, rotation of the core 65, along with the complex sealing path leading radially inward, inhibits leakage. In addition, the flinger section 90 directs lubricant radially outward where it may leave the cavity 81 along wall 93 and away from the sealing path. The circumferential wall 77 may be spaced apart from the engagement wall 79 a selected distance D, and the flinger's outer rim section 92 may extend across at least fifty percent of the distance D, and may extend approximately seventy-five percent of the distance D to direct lubricant radially outward and away from the sealing path.

Figure 3:
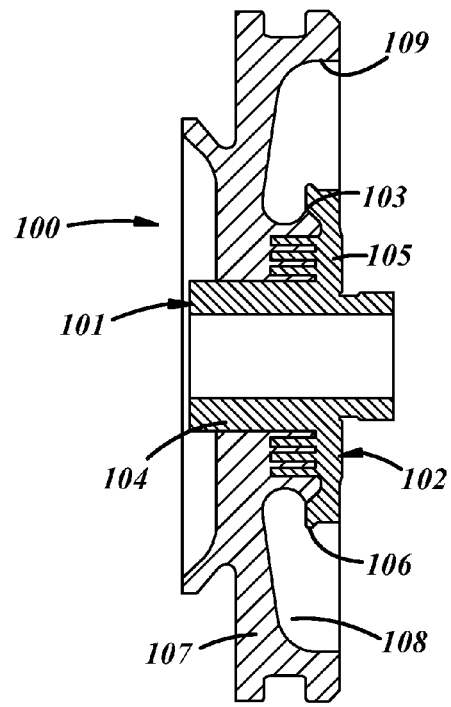
FIG. 3 is a cross sectional illustration of a flinger and insert for a turbocharger assembly according to a number of variations.

According to a number of additional variations as illustrated in FIG. 3, an insert assembly 100 may include an insert 107 similar to the insert 70 of FIG. 2. The mating core 101 may include a flinger section 102 which may extend along the annular ridge 103 of the insert 107 and radially outward from the cylindrical section 104. The flinger section 102 may include an inner support section 105 and an outer rim section 106. The outer rim section 106 of the flinger section 102 may be configured to direct lubricant into the cavity 108, and at the wall 109 of the insert 101. The outer rim section 106 may be substantially aligned in the radially direction with the annular ridge 103 and may extend across a relatively small part of the cavity 108.

Figure 4:
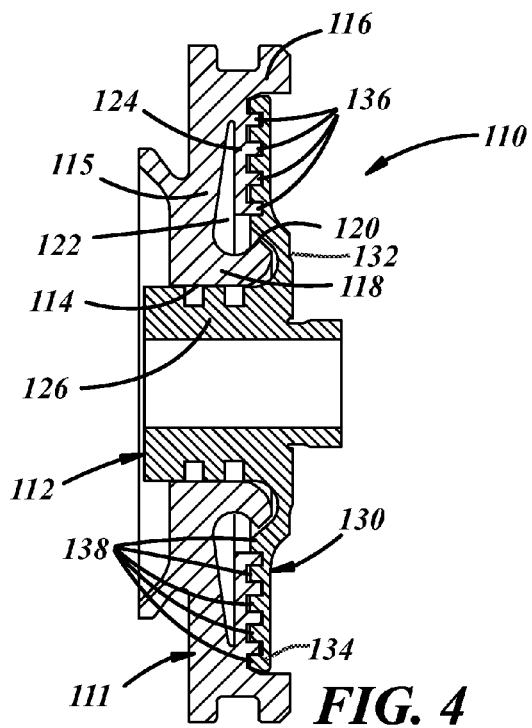
FIG. 4 is a cross sectional illustration of a flinger and insert for a turbocharger assembly according to a number of variations.

Referring to FIG. 4, in a number of other variations, an insert assembly 110 may include an insert 111 and a core 112. The insert 111 may include an axial opening 114 with an annular wall 115 extending radially outward and around the axial opening 114. The annular wall 115 may terminate at a circumferential wall 116 that extends axially from the annular wall 115. The insert 111 may include an engagement wall 118 that extends axially from the annular wall 115 and may be located radially inside from, and spaced apart from, the circumferential wall 116. The engagement wall 118 may include an annular ridge 120 that extends radially outward. An annular cavity 122 may be defined between the circumferential wall 116 and the engagement wall 118. The insert 111 may include a sealing wall 124 that extends radially inward from the circumferential wall 116.

The core 112 of insert assembly 110 may include a cylindrical section 126 that extends axially through the axial opening 114 of the insert 111. A flinger section 130 may extend along the annular ridge 120 and radially outward from the cylindrical section 126. The flinger section 130 may include an inner support section 132 and an outer rim section 134 that may be adapted to provide a series of elements to mesh with the sealing wall 124. The series of intermeshing elements may include four annular projecting walls 136 disposed on the sealing wall 124 and five annular meshing walls 138 on the core 112. The five meshing walls 138 may intermesh with and around the four projecting walls 136. The radially inner-most meshing wall may mesh between the radially inner-most projecting wall and the engagement wall 118. The outer rim section 134 may extend radially completely across the cavity 122 and the radially outermost meshing wall may be engaged between the radially outermost projecting wall and the circumferential wall 116.

Figure 5:
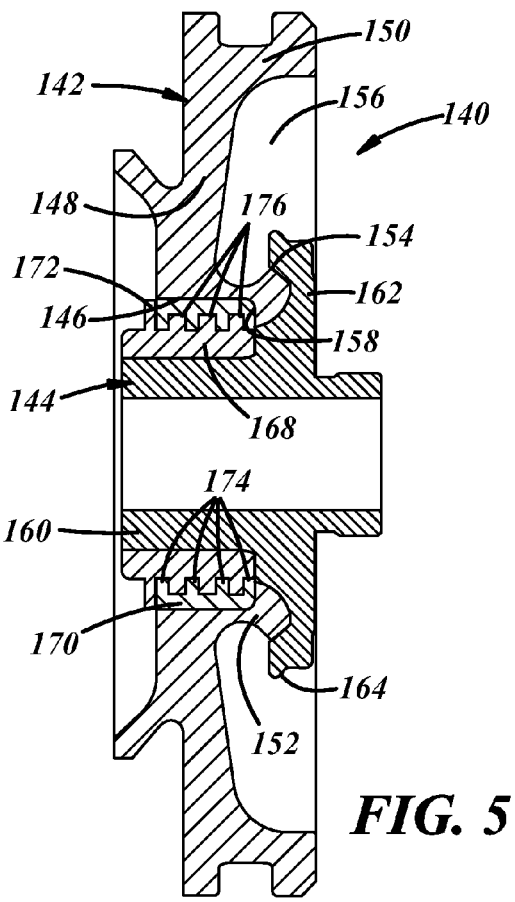
FIG. 5 is a cross sectional illustration of a flinger and insert for a turbocharger assembly according to a number of variations.

In a number of other variations as illustrated in FIG. 5, an insert assembly 140 may include an insert 142 and a core 144, with a pair of rings providing a series of intermeshing elements. The insert 142 may include an axial opening 146 with an annular wall 148 extending radially outward and around the axial opening 146. The annular wall 148 may terminate at a circumferential wall 150 that extends axially from the annular wall 148. The insert 142 may include an engagement wall 152 that extends axially from the annular wall 148 and may be located radially inside from, and spaced apart from, the circumferential wall 150. The engagement wall 152 may include an annular ridge 154 that extends radially outward. An annular cavity 156 may be defined between the circumferential wall 150 and the engagement wall 152. The core 144 may include a cylindrical section 160 that extends axially through the axial opening 146 of the insert 142. A flinger section 162 may extend along the annular ridge 154 and radially outward from the cylindrical section 160. The flinger section 162 may include an outer rim section 164 that may be adapted to direct lubricant at the insert 142 within the cavity 156.

Figure 6:
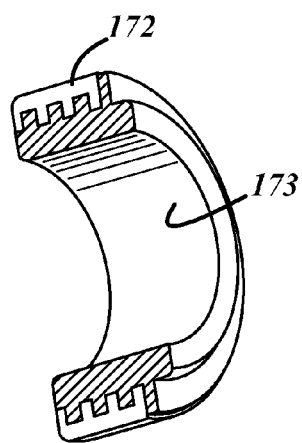
FIG. 6 is an isometric illustration of intermeshing ring elements according to a number of variations.
Figure 7:
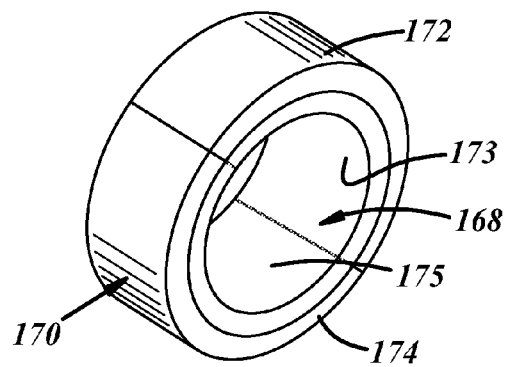
FIG. 7 is an assembly of two semi-circular intermeshing ring elements of FIG. 6.

A ring 168 may be disposed around the cylindrical section 160 and another ring 170 may be disposed around the first ring 168 and inside the axial opening 146. The insert 142 may include an annular shoulder 158 directed radially, which along with the axial opening 146, forms a receiver for the ring 170. The ring 168 may include a side wall 172 that extends radially. A series of intermeshing elements may include four projecting walls 174 disposed on the ring 170 and extending radially. The intermeshing elements may also include three meshing walls 176 on the ring 170 that extend radially where the three meshing walls 176 and the side wall 172 intermesh with the four projecting walls 174 to provide a sealing path. The ring 170 may be fixed to the insert 142 and the ring 168 may be fixed to, and rotate with, the core 144. Referring to FIG. 6, the rings 168, 170 may each be formed from semi-circular segments 172, 173 that are engaged with another pair of semi-circular segments 174, 175 as shown in FIG. 7. The two pairs of semi-circular segments may together form the rings 168 and 170.

Through the foregoing variants, an effective seal is provided between a compressor area and a central housing's lubricated area. An insert assembly may be provided wherein an insert and a core engage through intermeshing elements that do not include piston-type sealing rings of the type used as rings 25 in FIG. 1. The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product for use with a turbocharger system and may include a housing with a shaft that rotates and extends into the housing. A compressor wheel connected to the shaft. An insert assembly may be disposed around the shaft and may be positioned between the compressor wheel and the housing. The insert assembly may include a first component and a second component. The first and second components may be engaged through a series of intermeshing elements defining a tortuous sealing path. The first component may include an axial opening with an annular wall extending radially around the axial opening. The annular wall may terminate in a circumferential wall that extends axially. The first component may also include an engagement wall that extends axially and that is located radially inside from, and may be spaced apart from, the circumferential wall. An annular cavity may be defined between the circumferential wall and the engagement wall. The second component may include a cylindrical section that extends axially through the axial opening. The second component may also include a flinger section that may extend along the annular ridge and radially outward from the cylindrical section. The flinger section may be directed into the cavity.

Variation 2 may include a product according to variation 1 wherein the series of intermeshing elements may include three projecting walls on the first component and three meshing walls on the second component. The three meshing walls may intermesh between the three projecting walls and the engagement wall.

Variation 3 may include a product according to variation 1 or 2 wherein the first component may include a sealing wall that extends radially inward from the circumferential wall and into the cavity. The series of intermeshing elements may include four projecting walls disposed on the sealing wall and five meshing walls on the second component. The five meshing walls may intermesh with and around the four projecting walls.

Variation 4 may include a product according to variation 1 wherein the series of intermeshing elements May include a first ring disposed around the cylindrical section and a second ring disposed around the first ring and inside the axial opening. The second ring may including a side wall that extends radially. The series of intermeshing elements may include four projecting walls disposed on the first ring that extend radially and three meshing walls on the second ring. The three meshing walls and the side wall may intermesh with the four projecting walls.

Variation 5 may include a product according to variation 4 wherein the first ring may rotate relative to the second ring.

Variation 6 may include a product according to variation 4 wherein the first and second rings may each be formed from two separate semi-circular segments that are engaged together.

Variation 7 may include a product according to any of variations 1 through 6 wherein the circumferential wall may be spaced apart from the engagement wall a distance, and wherein the flinger element may extend across at least fifty percent of the distance.

Variation 8 may include a product according to any of variations 1 through 7 wherein the first and second components do not include piston-type sealing rings between the first and second components.

Variation 9 may include a product according to any of variations 1 through 8 wherein the cylindrical section may extend axially out of both a first side and a second side of the first component. The second component may be positioned on the second side. The cylindrical section may form a spacer section extending away from the second side and beyond the flinger section.

Variation 10 may involve a turbocharger assembly for use with an internal combustion engine and may include a housing with a shaft rotatably supported by the housing with a lubricant provided in the housing. A turbine wheel may be connected to a first end of the shaft. The turbine may rotate in response to a flow of exhaust gas from the internal combustion engine. A compressor wheel may be connected to a second end of the shaft. The compressor wheel may be driven by the turbine wheel through the shaft. An insert assembly may be disposed around the shaft and may be positioned between the compressor wheel and the housing to close the aperture. The insert assembly may include a first component that may rotate with the shaft and a second component that may be fixed to the housing. The first and second components may be engaged through a series of intermeshing elements defining a tortuous sealing path. The first component may include an axial opening with an annular wall extending radially around the axial opening. The annular wall may terminate in a circumferential wall that may extend axially. The first component may include an engagement wall that may extend axially and that may be located radially inside from and may be spaced apart from the circumferential wall. An annular cavity may be defined between the circumferential wall and the engagement wall. The second component may include a cylindrical section that may extend through the axial opening. The second component may include a flinger section that may extend radially outward from the cylindrical section. The flinger section may direct the lubricant into the cavity and at the first component.

Variation 11 may include a turbocharger assembly according to variation 10 wherein the series of intermeshing elements of the first component may be formed on the flinger section.

Variation 12 may involve a product for use with a turbocharger system and may include a housing with an aperture extending into the housing. The housing may have an area containing a lubricant. A shaft may rotate and may extend into the aperture. A compressor wheel may be connected to the shaft. An insert assembly may be disposed around the shaft and may be positioned between the compressor wheel and the housing to close the aperture. The insert assembly may include a first component that rotates with the shaft and a second component that may be fixed to the housing. The first and second components may be engaged through a series of intermeshing elements defining a tortuous sealing path. The first component may include an axial opening with an annular wall extending radially around the axial opening. The annular wall may terminate in a circumferential wall that may extend axially. The first component may include an engagement wall that may extend axially and that may be located radially inside from and spaced apart from the circumferential wall. The engagement wall may include an annular ridge extending radially outward. An annular cavity may be defined between the circumferential wall and the engagement wall. The second component may include a cylindrical section that may extend axially through the axial opening. The second component may include a flinger section that may extend along the annular ridge and radially outward from the cylindrical section. The flinger section may direct the lubricant into the cavity and at the first component.

Variation 13 may include a product according to variation 12 wherein the series of intermeshing elements may include three projecting walls on the first component and three meshing walls on the second component. The three meshing walls may intermesh between the three projecting walls and the engagement wall.

Variation 14 may include a product according to variation 12 or 13 wherein the first component may include a sealing wall that may extend radially inward from the circumferential wall. The series of intermeshing elements may include four projecting walls disposed on the sealing wall and five meshing walls on the second component wherein the five meshing walls intermesh with and around the four projecting walls.

Variation 15 may include a product according to variation 12 wherein the series of intermeshing elements may include a first ring disposed around the cylindrical section and a second ring disposed around the first ring and inside the axial opening. The second ring may including a side wall that extends radially. The series of intermeshing elements may include four projecting walls disposed on the first ring that extend radially and three meshing walls on the second ring. The three meshing walls and the side wall may intermesh with the four projecting walls.

Variation 16 may include a product according to variation 15 wherein the first and second rings may each be formed from two separate semi-circular segments that are engaged together.

Variation 17 may include product according to variation 12 wherein the circumferential wall may be spaced apart from the engagement wall a distance. The flinger element may extend across at least fifty percent of the distance.

Variation 18 may include a product according to any of variations 12 through 17 wherein the first and second components do not include piston-type sealing rings between the first and second components.

Variation 19 may include a product according to variation 12 wherein the cylindrical section may extend axially out of both a first side and a second side of the first component. The second component may be positioned on the second side. The cylindrical section may form a spacer section extending away from the second side and beyond the flinger section.

Variation 20 may include a product according to variation 19 wherein the series of intermeshing elements may be coaxially disposed.

The above description of select variations within the scope of the invention is merely illustrative in nature and, thus, variations or variants thereof are not to be regarded as a departure from the spirit and scope of the invention.

What is claimed is:

1. A product for use with a turbocharger system comprising:
    a housing;
    a shaft that rotates and extends into the housing;
    a compressor wheel connected to the shaft;
    an insert assembly disposed around the shaft and positioned between the compressor wheel and the housing;
    wherein the insert assembly comprises a first component and a second component, wherein the first and second components are engaged through a series of intermeshing elements defining a tortuous sealing path, and the first component comprising an axial opening with an annular wall extending radially around the axial opening, the annular wall terminating in a circumferential wall that extends axially, the first component also comprising an engagement wall that extends axially and that is located radially inside from and spaced apart from the circumferential wall, wherein an annular cavity is defined between the circumferential wall and the engagement wall, the second component comprising a cylindrical section that extends axially through the axial opening, wherein the engagement wall includes an annular ridge extending radially outward and the second component also comprises a flinger section that extends along the annular ridge and radially outward from the cylindrical section, the flinger section directed into the cavity.

2. The product according to claim 1 wherein the series of intermeshing elements comprise three projecting walls on the first component and three meshing walls on the second component wherein the three meshing walls intermesh between the three projecting walls and the engagement wall.

3. The product according to claim 1 wherein the first component comprises a sealing wall that extends radially inward from the circumferential wall and into the cavity, and wherein the series of intermeshing elements comprise four projecting walls disposed on the sealing wall and five meshing walls on the second component wherein the five meshing walls intermesh with and around the four projecting walls.

4. The product according to claim 1 wherein the series of intermeshing elements comprise a first ring disposed around the cylindrical section and a second ring disposed around the first ring and inside the axial opening, the second ring including a side wall that extends radially, and wherein the series of intermeshing elements comprise four projecting walls disposed on the first ring that extend radially and three meshing walls on the second ring wherein the three meshing walls and the side wall intermesh with the four projecting walls.

5. The product according to claim 4 wherein the first ring rotates relative to the second ring.

6. The product according to claim 4 wherein the first and second rings are each formed from two separate semi-circular segments that are engaged together.

7. The product according to claim 1 wherein the circumferential wall is spaced apart from the engagement wall a distance, and wherein the flinger element extends across at least fifty percent of the distance.

8. The product according to claim 1 wherein the cylindrical section extends axially out of both a first side and a second side of the first component, and wherein the second component is positioned on the second side, and wherein the cylindrical section forms a spacer section extending away from the second side and beyond the flinger section.

9. A product for use with a turbocharger system comprising:
   a housing;
   a shaft that rotates and extends into the housing;
   a compressor wheel connected to the shaft;
   an insert assembly disposed around the shaft and positioned between the compressor wheel and the housing;
   wherein the insert assembly comprises a first component and a second component, wherein the first and second components are engaged through a series of intermeshing elements defining a tortuous sealing path, and the first component comprising an axial opening with an annular wall extending radially around the axial opening, the annular wall terminating in a circumferential wall that extends axially, the first component also comprising an engagement wall that extends axially and that is located radially inside from and spaced apart from the circumferential wall, wherein an annular cavity is defined between the circumferential wall and the engagement wall, the second component comprising a cylindrical section that extends axially through the axial opening, and the second component also comprises a flinger section that extends along an annular ridge and radially outward from the cylindrical section, the flinger section directed into the cavity, wherein the first and second components do not include piston-type sealing rings between the first and second components.

10. A turbocharger assembly for use with an internal combustion engine comprising:
    a housing;
    a shaft rotatably supported by the housing with a lubricant provided in the housing;
    a turbine wheel connected to a first end of the shaft, the turbine wheel rotating in response to a flow of exhaust gas from the internal combustion engine;
    a compressor wheel connected to a second end of the shaft, the compressor wheel driven by the turbine wheel through the shaft;
    an insert assembly disposed around the shaft and positioned between the compressor wheel and the housing to close the aperture;
    wherein the insert assembly comprises a first component that is fixed to the housing and a second component that rotates with the shaft, and the first and second components are engaged through a series of intermeshing elements defining a tortuous sealing path, and the first component comprising an axial opening with an annular wall extending radially around the axial opening, the annular wall terminating in a circumferential wall that extends axially, the first component also comprising an engagement wall that extends axially and that is located radially inside from and spaced apart from the circumferential wall, the engagement wall including an annular ridge that extends radially outward, wherein an annular cavity is defined between the circumferential wall and the engagement wall, the second component comprising a cylindrical section that extends through the axial opening, and the second component also comprises a flinger section that extends radially outward from the cylindrical section, the flinger section directing the lubricant into the cavity and at the first component.

11. The turbocharger assembly according to claim 10 wherein the series of intermeshing elements of the second component are formed on the flinger section.

12. A product for use with a turbocharger system comprising:
    a housing with an aperture extending into the housing, wherein the housing has an area containing a lubricant;
    a shaft that rotates and extends into the aperture;
    a compressor wheel connected to the shaft;
    an insert assembly disposed around the shaft and positioned between the compressor wheel and the housing to close the aperture;
    wherein the insert assembly comprises a first component that is fixed to the housing and a second component that rotates with the shaft, and the first and second components are engaged through a series of intermeshing elements defining a tortuous sealing path, and the first component comprising an axial opening with an annular wall extending radially around the axial opening, the annular wall terminating in a circumferential wall that extends axially, the first component also comprising an engagement wall that extends axially and that is located radially inside from and spaced apart from the circumferential wall, the engagement wall including an annular ridge extending radially outward, wherein an annular cavity is defined between the circumferential wall and the engagement wall, the second component comprising a cylindrical section that extends axially through the axial opening, and the second component also comprises a flinger section that extends along the annular ridge and radially outward from the cylindrical section, the flinger section directing the lubricant into the cavity and at the first component.

13. The product according to claim 12 wherein the series of intermeshing elements comprise three projecting walls on the first component and three meshing walls on the second component wherein the three meshing walls intermesh between the three projecting walls and the engagement wall.

14. The product according to claim 12 wherein the first component comprises a sealing wall that extends radially inward from the circumferential wall, and wherein the series of intermeshing elements comprise four projecting walls disposed on the sealing wall and five meshing walls on the second component wherein the five meshing walls intermesh with and around the four projecting walls.

15. The product according to claim 12 wherein the series of intermeshing elements comprises a first ring disposed around the cylindrical section and a second ring disposed around the first annular ring and inside the axial opening, the second ring including a side wall that extends radially, and wherein the series of intermeshing elements comprise four projecting walls disposed on the first ring that extend radially and three meshing walls on the second ring wherein the three meshing walls and the side wall intermesh with the four projecting walls.

16. The product according to claim 15 wherein the first and second rings are each formed from two separate semi-circular segments that are engaged together.

17. The product according to claim 12 wherein the circumferential wall is spaced apart from the engagement wall a distance and wherein the flinger element extends across at least fifty percent of the distance.

18. The product according to claim 12 wherein the first and second components do not include piston-type sealing rings between the first and second components.

19. The product according to claim 12 wherein the cylindrical section extends axially out of both a first side and a second side of the first component, and wherein the second component is positioned on the second side, and wherein the cylindrical section forms a spacer section extending away from the second side and beyond the flinger section.

20. The product according to claim 12 wherein the series of intermeshing elements are coaxially disposed.

* * * * *